United States Patent
Morel et al.

(10) Patent No.: US 9,556,836 B2
(45) Date of Patent: Jan. 31, 2017

(54) PRESSURE RELIEF VALVE FOR SINGLE PLUNGER FUEL PUMP

(71) Applicant: Stanadyne LLC, Windsor, CT (US)

(72) Inventors: Kenneth R. Morel, Bloomfield, CT (US); Robert G. Lucas, Ellington, CT (US)

(73) Assignee: Stanadyne LLC, Windsor, CT (US)

( * ) Notice: Subject to any disclaimer, the term of this patent is extended or adjusted under 35 U.S.C. 154(b) by 0 days.

(21) Appl. No.: 14/690,999

(22) Filed: Apr. 20, 2015

(65) Prior Publication Data

US 2015/0300339 A1    Oct. 22, 2015

Related U.S. Application Data

(60) Provisional application No. 61/981,931, filed on Apr. 21, 2014.

(51) Int. Cl.
| | |
|---|---|
| *F04B 19/00* | (2006.01) |
| *F02M 37/00* | (2006.01) |
| *F02M 37/04* | (2006.01) |
| *F04B 1/04* | (2006.01) |
| *F04B 53/10* | (2006.01) |
| *F16K 17/04* | (2006.01) |

(52) U.S. Cl.
CPC ......... *F02M 37/0058* (2013.01); *F02M 37/04* (2013.01); *F04B 1/0452* (2013.01); *F04B 53/10* (2013.01); *F16K 17/04* (2013.01)

(58) Field of Classification Search
CPC ....... F02M 37/058; F02M 37/04; F16K 17/04; F16K 49/0315; F16K 53/10; F16K 1/0452
USPC .......... 417/470; 123/446, 447, 457–460, 506
See application file for complete search history.

(56) References Cited

U.S. PATENT DOCUMENTS

| | | | |
|---|---|---|---|
| 3,145,732 A | 8/1964 | Joles | |
| 3,977,649 A * | 8/1976 | Zeuner | F16K 17/04 251/30.02 |
| 4,653,978 A * | 3/1987 | Eberhardt | F04B 49/22 415/11 |
| 2002/0170537 A1 | 11/2002 | Reusing | |
| 2008/0156294 A1* | 7/2008 | Albrecht | F02M 59/34 123/446 |
| 2009/0178652 A1 | 7/2009 | Yamada et al. | |

(Continued)

FOREIGN PATENT DOCUMENTS

EP    1 898 084 A1    3/2008

*Primary Examiner* — Charles Freay
(74) *Attorney, Agent, or Firm* — Alix, Yale & Ristas, LLP

(57) ABSTRACT

A fuel pump including a low pressure infeed leading to a pumping chamber, a pumping plunger for pressurizing fuel in the pumping chamber, an outlet valve for delivering pressurized fuel from the pumping chamber to a high pressure outlet line during pumping, and an overpressure relief valve connected between the high pressure outlet line and the pumping chamber. A ball type relief valve element is spring biased to close against the relief valve seat. The spring is in a spring chamber that is fluidly isolated from the pumping chamber while the valve element is closed, preferably in direct hydraulic communication with the low pressure infeed, thereby reducing dead volume during normal pumping. The spring can act on the valve element through a piston, and in an alternative embodiment, the piston can provide a spill path from the pumping chamber to the low pressure infeed.

10 Claims, 7 Drawing Sheets

(56) References Cited

U.S. PATENT DOCUMENTS

| | | | |
|---|---|---|---|
| 2009/0252621 A1* | 10/2009 | Siegel | F02M 63/0036 |
| | | | 417/307 |
| 2010/0305883 A1* | 12/2010 | Danzy | F16K 17/04 |
| | | | 702/50 |
| 2011/0106393 A1* | 5/2011 | Pursifull | F02D 33/003 |
| | | | 701/101 |
| 2011/0126804 A1 | 6/2011 | Lucas et al. | |
| 2012/0251366 A1 | 10/2012 | Kuroyanagi et al. | |
| 2015/0285166 A1* | 10/2015 | Surnilla | F02D 33/003 |
| | | | 123/294 |

* cited by examiner

PRESSURE RELIEF VALVE FOR SINGLE PLUNGER FUEL PUMP

RELATED APPLICATION

This application claims priority under 35 U.S.C. §119(e) from U.S. Provisional Application No. 61/981,931 filed Apr. 21, 2014 for "Pressure Relief Valve for Single Plunger Fuel Pump".

BACKGROUND

The present invention relates to high pressure fuel supply pumps for gasoline engines.

Single piston, cam driven fuel pumps have become a common solution for generating high pressure fuel for common rail direct injection gasoline engines.

It is known in the industry that the pump must incorporate an outlet check valve to prevent pressure bleed back from the rail while the pump is in the intake stroke cycle. It has become an industry requirement to incorporate a pressure relief valve within the pump to protect the entire high pressure system from an unexpected excess pressure caused by a system malfunction. In order to protect the rail and fuel injectors, the pressure relief valve must be in hydraulic communication with the rail. Two executions of such hydraulic communication, in parallel with the pump flow, are described in U.S. Pat. No. 7,401,593 and U.S. Pat. No. 8,132,558. The executions described in the prior art are successful in their ability to achieve a reasonable relief pressure by hydraulically disabling the relief device during the pumping event when normal high pressure line pulsations occur.

While these executions are sufficient for current gasoline direct injection systems that operate up to about 200 Bar rail pressure, there is a significant limitation for future systems that will operate at higher pressures required to meet forthcoming emissions regulations. Because the pressure relief valve flow returns to the pumping chamber, its associated spring and spring cavity are in direct communication with the pumping chamber. This spring cavity adds significant dead volume to the pumping chamber circuit volume that must be compressed during each pumping event. Higher operating pressures require increased pressure relief valve opening pressures, higher spring loads, and increased spring cavity volume to accommodate the increased spring size. This added dead volume combined with the increased pumping pressures has a significant detrimental effect on pump efficiency.

SUMMARY

The present invention provides a solution with the same pressure relief valve function, but with a reduced pumping chamber circuit volume, and thus improved efficiency. This is accomplished by isolating the pressure relief valve spring chamber from the pumping chamber, such as by locating the pressure relief valve spring chamber within the low pressure side of the pump.

The spring load to the pressure relief valve is preferably applied through a close-fitting piston wherein the spring side of the piston is exposed to the low pressure side of the pump, and the valve side of the piston is exposed to pumping chamber pressure.

In an embodiment where the piston acts on a ball type relief valve, the piston sealing diameter should be less than or equal to the pressure relief valve sealing diameter in order to achieve a reasonable relief valve opening pressure.

According to a refinement, a secondary relief function is provided to accommodate a severe system malfunction. This added relief function would become enabled when the relief valve piston is advanced to a position associated with very high pumping chamber pressures. This function is achieved by the addition of a drilling through the relief valve piston that becomes uncovered from the piston bore in the advanced position, thereby connecting the pumping chamber with the low pressure side of the pump, relieving the excess pumping chamber pressure.

Since the volume of the relief spring chamber for high pressure systems is much larger than the volume of the related flow passages and relief valve chamber, eliminating the relief spring chamber from the cyclic pressurization of the pumping chamber circuit volume resulting from the reciprocation of the pumping plunger significantly reduces dead volume and thereby increases efficiency.

BRIEF DESCRIPTION OF THE DRAWING

Exemplary embodiments will be described below with reference to the accompanying drawing, in which.

DETAILED DESCRIPTION

Two representative embodiments will be described with reference to the accompanying FIGS. 1-7.

Figure 1:
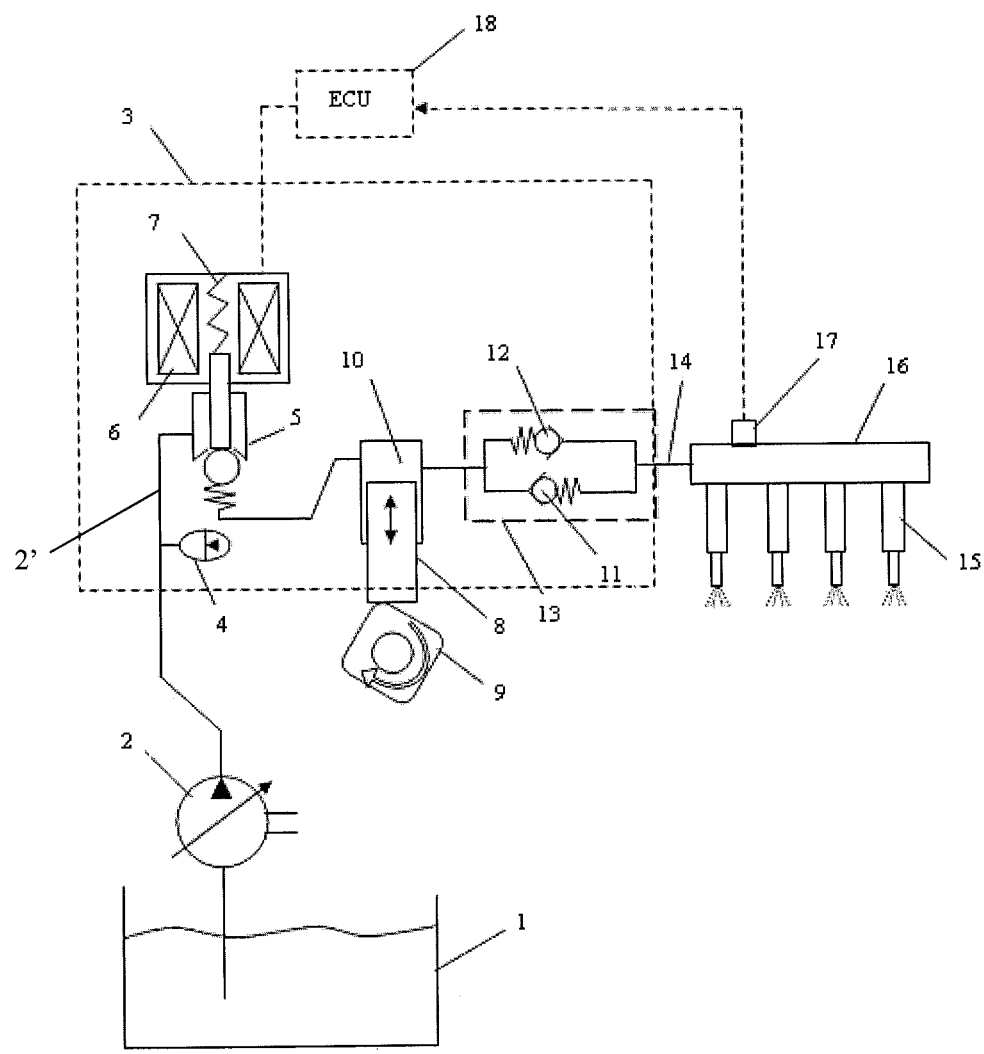
FIG. 1 is a schematic representation of a known common rail fuel supply system.

FIG. 1 is an overall system schematic illustrating the fuel system for an internal combustion engine as described in U.S. Pub. US 2011/0126804. The low-pressure pump 2 pressurizes fuel from the fuel tank 1, and delivers it at low feed pressure to the high pressure pump 3 through an inlet fitting. The fuel then passes by an accumulator 4, and continues at low pressure through passage 2' to a normally open inlet control valve 5. A normally closed control valve is also applicable to such a fuel system. The fuel is then drawn into the pumping chamber 10, where it is pressurized by the upward motion of the pumping plunger 8 as reciprocally driven by the engine camshaft 9. The inlet control valve 5 is acted upon by the control valve spring 7 and solenoid 6 to control the quantity of fuel delivered by the high pressure pump. This is accomplished by the accurate timing of the control valve closing relative to the pumping piston upward travel position.

The pressurized fuel travels through the outlet check valve 11, high pressure line 14, and into the common rail 16 that feeds the engine fuel injectors 15. Because the injectors are fed from a common rail, injector timing is flexible. Desired rail pressure is controlled by a closed loop electronic control unit (ECU) 18, based on feedback and control of the high pressure fuel output via the solenoid 6 and control valve 5 compared to the rail pressure sensor 17 output signal to the ECU 18. A pressure relief valve 12 is required to protect the high pressure system in case of a system malfunction. The outlet check valve and pressure relief valve are preferably in a common fitting assembly 13, but this is not required for the present invention.

Figure 2:
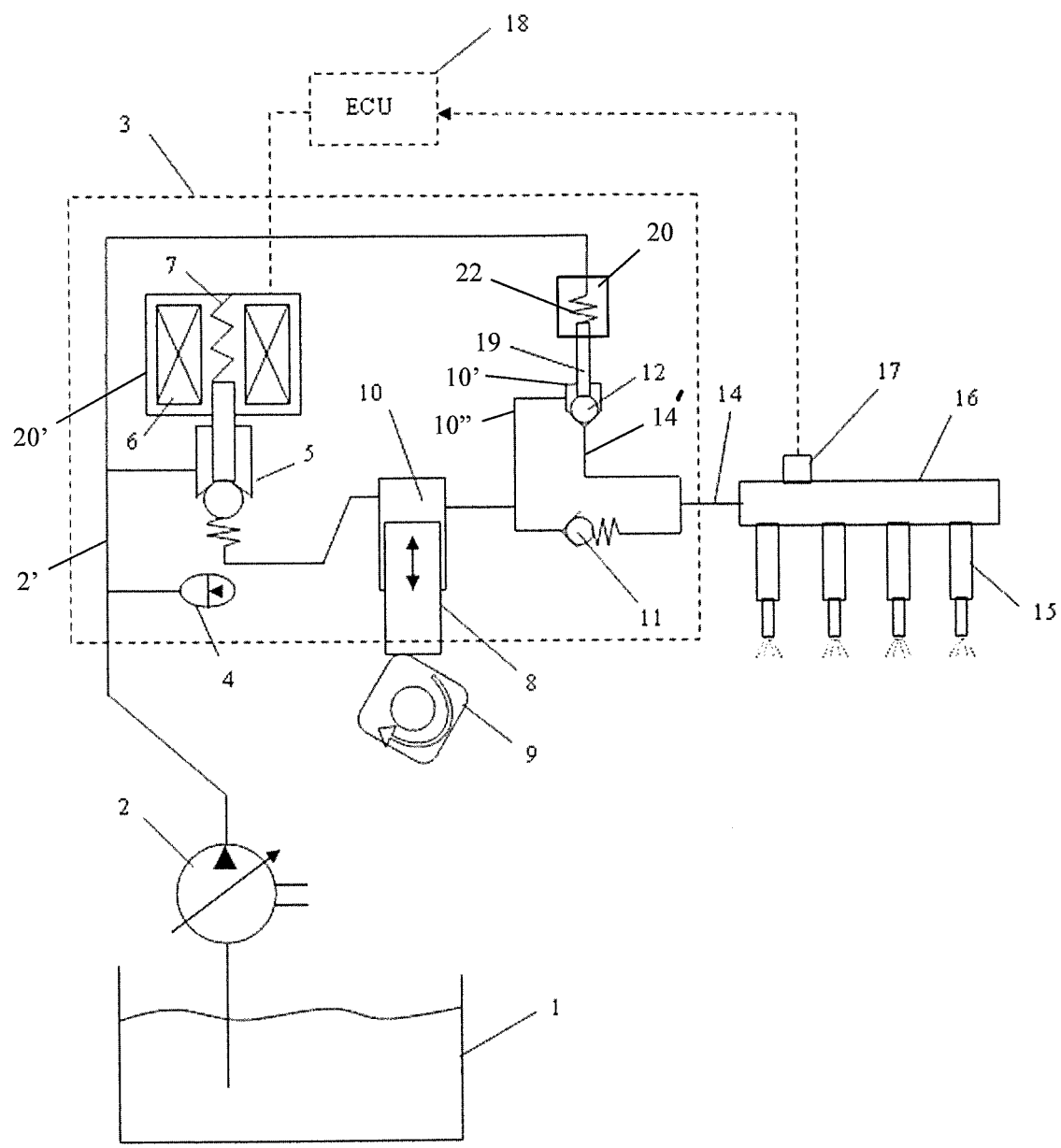
FIG. 2 is a schematic incorporating a first embodiment of the relief valve in accordance with the present invention.

FIG. 2 is a schematic incorporating a first embodiment of the relief valve in accordance with the present invention. The normal pump operation is the same as the pump described in FIG. 1. In this embodiment however, the relief valve 12 is urged against its sealing seat via a spring located in the low pressure side of the pump and a relief valve spring isolation piston 19, which also separates the pumping chamber pressure 10 from the low pressure side of the pump. During a system malfunction, the excess pressure in the rail 16 and line 14 opens the relief valve 12, moving the relief valve spring isolation piston 19, and flowing fuel back to pumping chamber 10 during the charging cycle of the pump. In this embodiment, the pressure relief spring cavity 20 is in direct fluid communication via passage 20', entirely within the pump, with the inlet line or passage to the inlet control valve 5.

Figure 3:
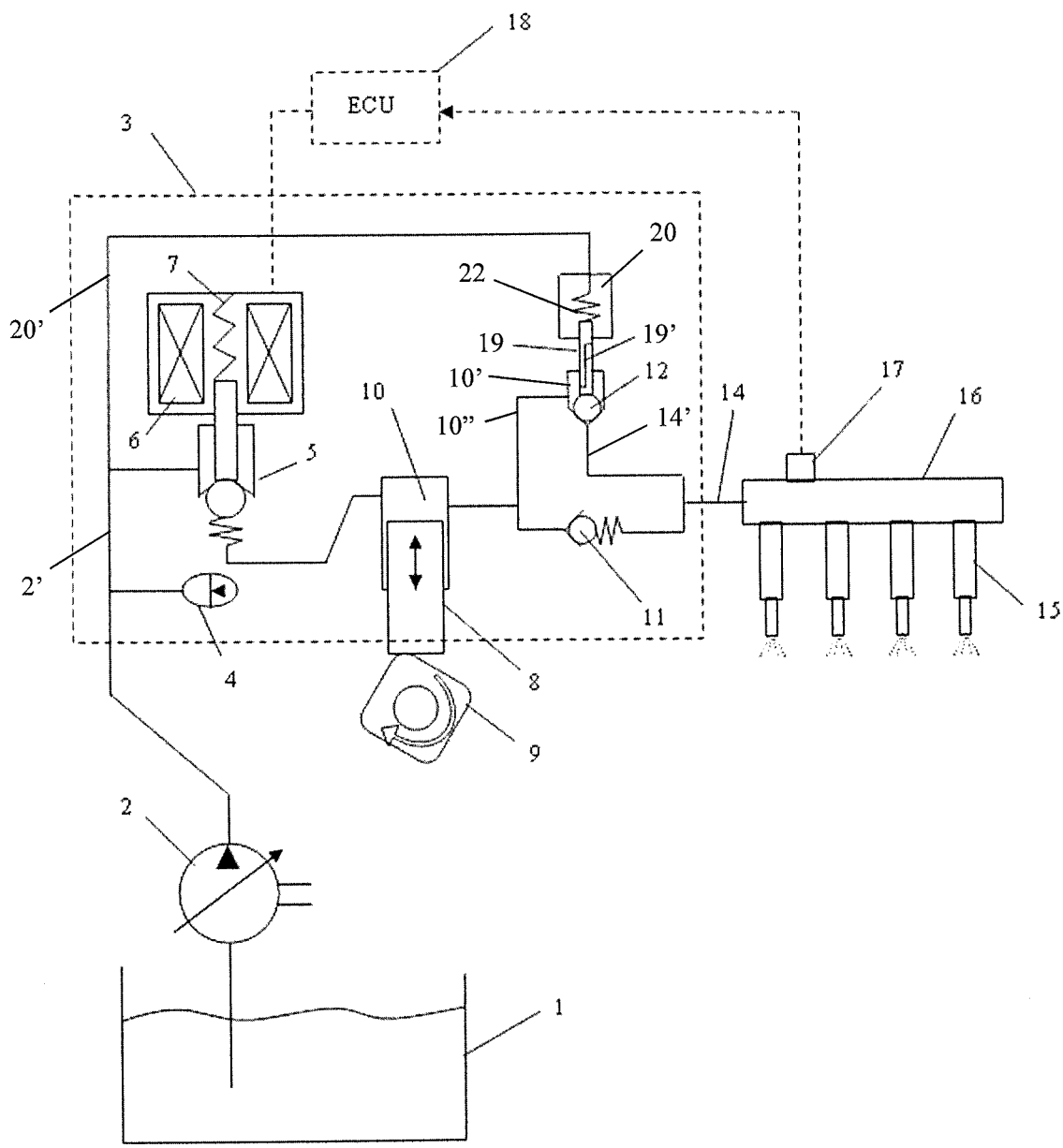
FIG. 3 is a schematic incorporating a second embodiment of the relief valve in accordance with the present invention.

FIG. 3 is a schematic incorporating a second embodiment of the relief valve in accordance with the present invention. In this embodiment, excessive pressure in the pumping chamber 10 (caused by a severe high speed system malfunction for example), induces the relief valve spring isolation piston 19 to retract in its bore to a position allowing the overpressure spill channel 19' to fluidly connect the pumping chamber 10 with the low-pressure spring chamber 20 and thereby spill chamber pressure into the low pressure side of the pump.

Figure 4:
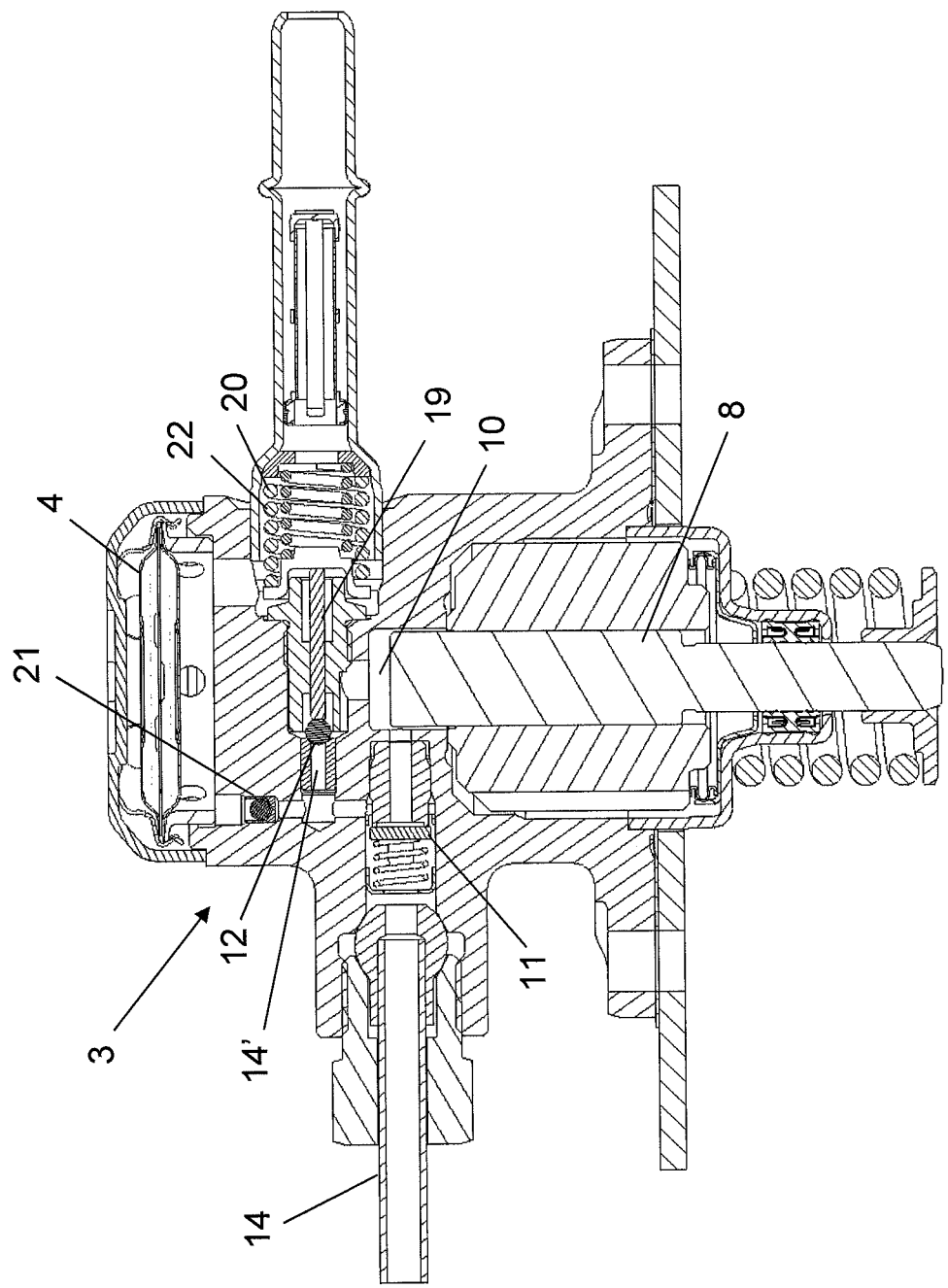
FIG. 4 shows one execution of the pump described with respect to FIG. 2.
Figure 5:
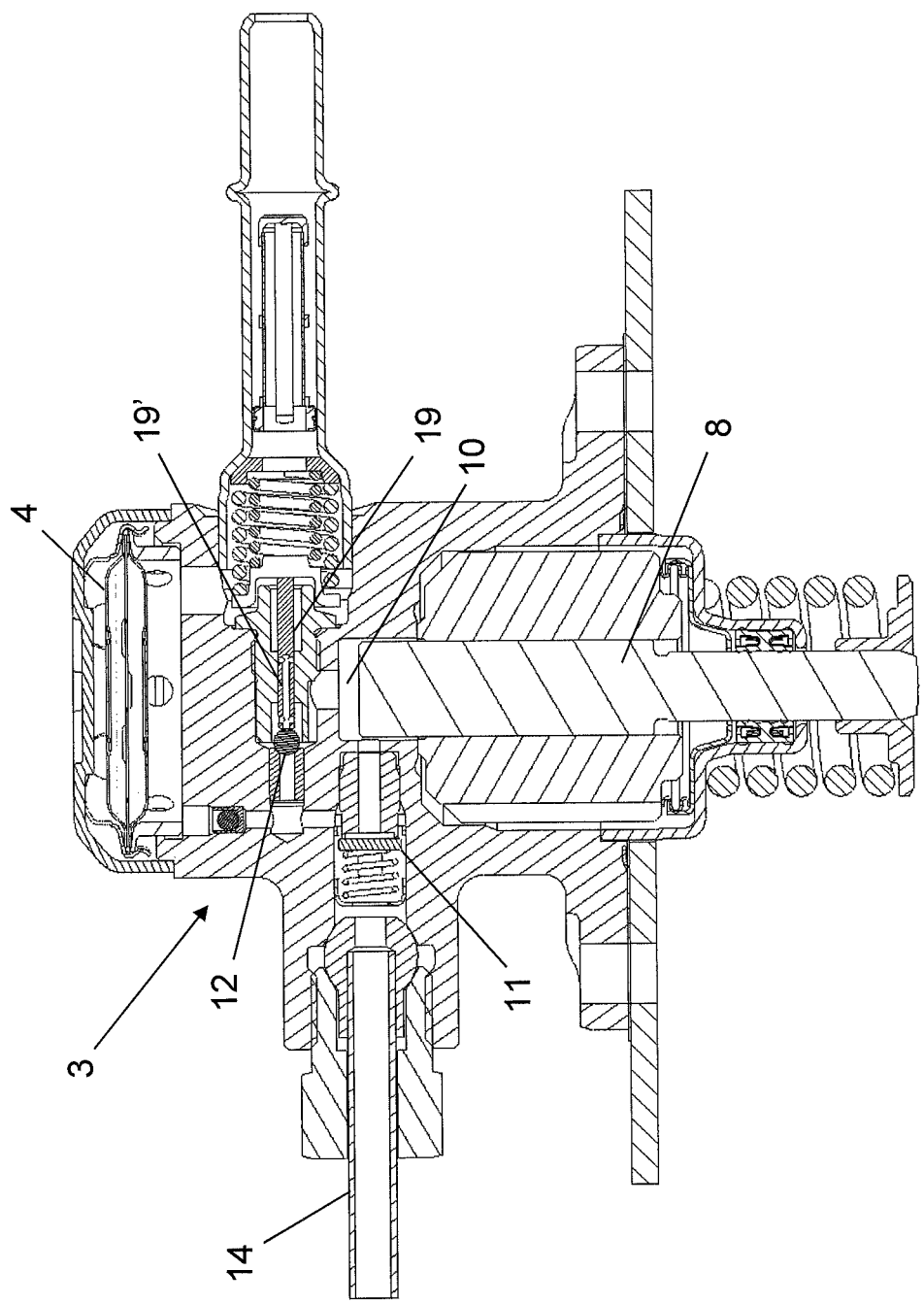
FIG. 5 shows one execution of the second embodiment of the pressure relief valve described with respect to FIG. 3.

FIG. 4 shows one execution of the pump described with respect to FIG. 2, and FIG. 5 shows one execution of the second embodiment of the pressure relief valve described with respect to FIG. 3.

Figure 6:
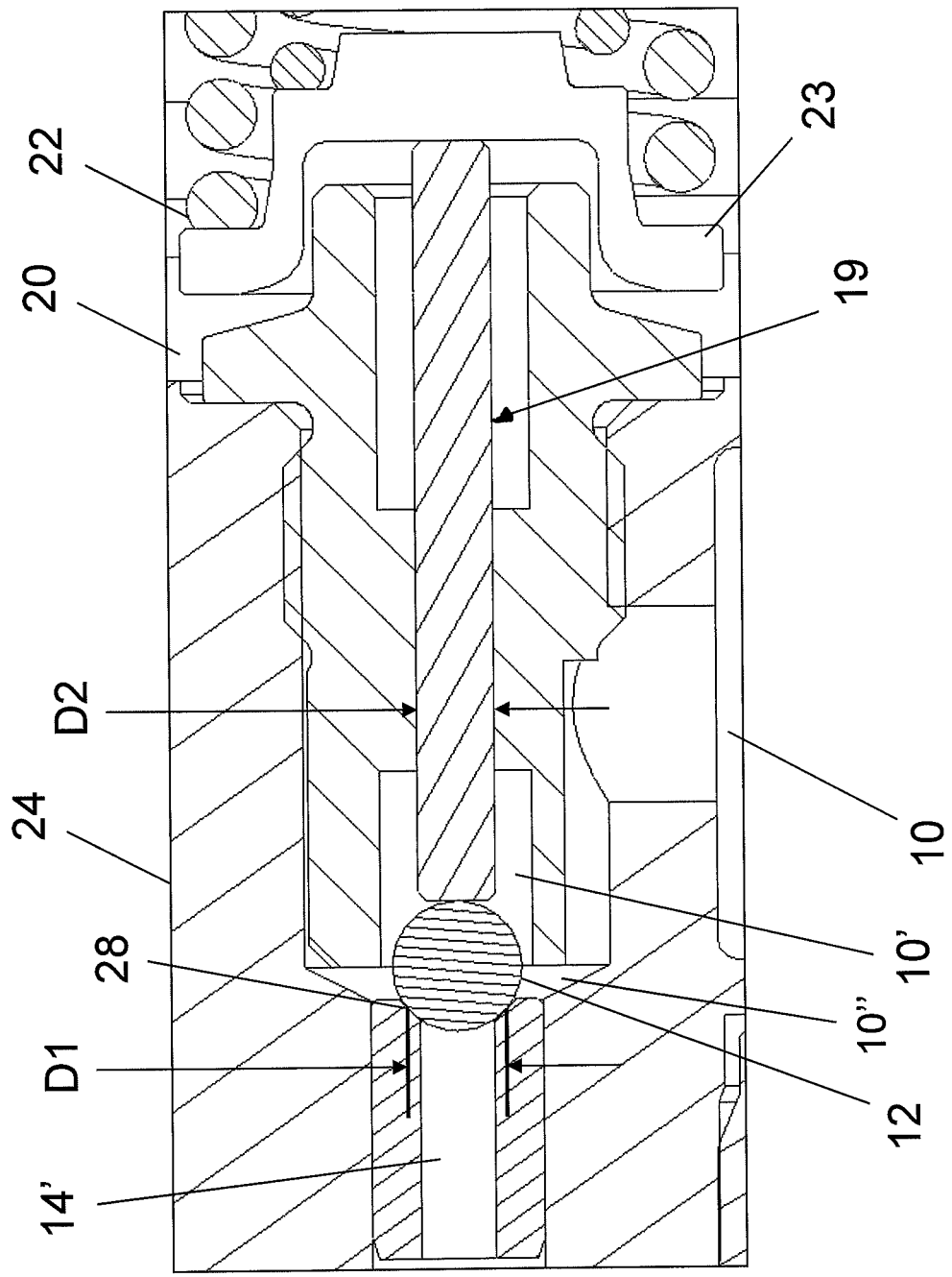
FIG. 6 is a detailed view in the area of the pressure relief valve of FIG. 4.

In FIG. 4, a ball type relief valve 12 seals against the pressure in the high pressure line 14 via flow channels including flow passage 14'. Also included in the execution is a high pressure sealing plug 21. FIG. 6 is a detailed view in the area of the pressure relief valve of FIG. 4. It is advantageous to have the sealing diameter D2 of the piston 19 less than or equal to the sealing diameter D1 of the ball 12 against the ball seat. This prevents unwanted motion of the piston 19 during a normal pumping event when pumping chamber 10 and channel 10' pressures spike above rail pressure at high speeds, but also allows a reasonable opening pressure of the relief valve 12 during the pump charging event, or during a hot soak. The spring 22 can operate directly on the piston 19 or as shown, through an intermediate spring seat 23.

In FIG. 5, the piston 19 includes an overpressure spill connection 19' defined by 19a, 19b, and 19c. This is shown in closer detail in FIG. 7. The piston 19 is mounted in the bore of sleeve 24. The sleeve has a front cavity 10' with ball valve 12 in fluid communication via channel 10" with the pumping chamber 10 and a back cavity 26 in fluid communication with spring chamber 20. The back portion of the piston 19 extends through back cavity 26 into spring cavity 20 for loading by spring 22. The piston has a front port 19a leading to a central bore 19b which fluidly connects to a back port 19c. The bore 19b extends only part way through the piston 19, with back port 19c blocked by the sleeve ID when the valve 12 is seated and when valve 12 lifts off seat 28, moving the piston 19 a first, relatively short distance (less than 'X'), to provide the pressure relief from high pressure line 14, 14' back into the pumping chamber 10 via passage 10".

During a severe system malfunction, the pressure in pumping chamber 10 and channel 10' can overcome the closing pressure defined by the load from spring 22 and the piston diameter, thereby moving the piston 19 by at least distance 'X'. This connects pumping chamber pressure in channel 10" and chamber or cavity 10' to the low pressure in back cavity 26 and spring chamber 20, thus spilling pumping chamber pressure from 10 to the low pressure side of the pump. The piston 19 will advance past distance 'X' during the pumping stroke if the hydraulic force is sufficient to overcome the force from spring 22. The piston is thus displaceable in the bore a second distance greater than 'X' from seat 28 by the force of fuel pressure in chamber 10 acting against piston 19 during a pumping stroke. During that condition the pressure acts independently of the ball, against the OD and back wall of bore 19b to advance the piston until port 19c is exposed.

Figure 7:
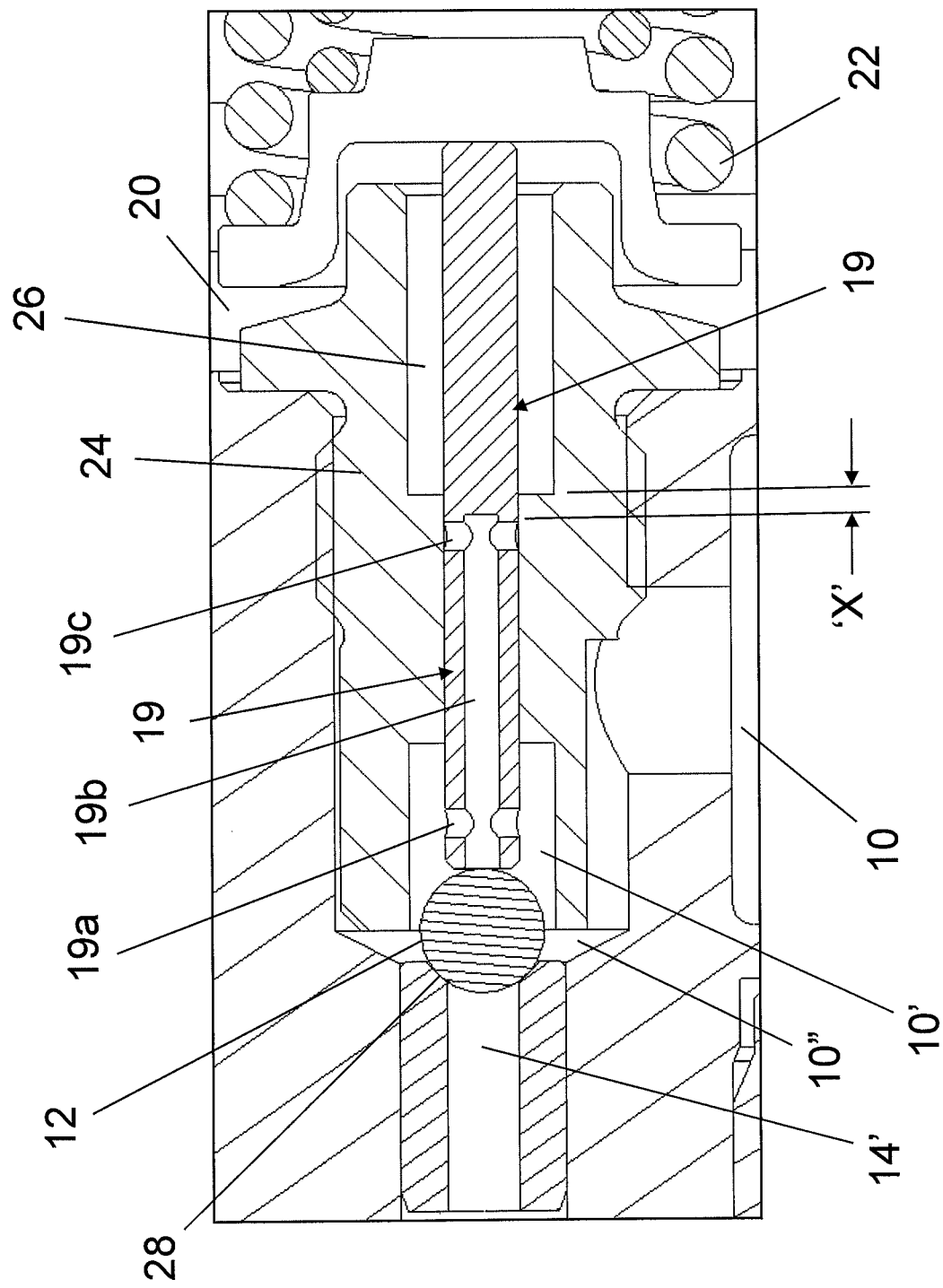
FIG. 7 is a detailed view in the area of the pressure relief valve of FIG. 5.

If the rail pressure is too high and relieves into the pumping chamber during the next charging stroke, the pumping chamber 10 will have higher pressure than it would normally have when beginning the next pumping stroke. Depending on the RPM and total flow being recirculated, it can begin to "back up", driving the rail pressure to a much higher level. In the embodiment of FIGS. 2 and 6, the overpressure will dump back to the pumping chamber; this will keep flowing in a closed circuit 10, 11, 14', 12, 10', 10", 10. In the embodiments of FIGS. 3 and 7 the pumping stroke overpressure would spill through 10', 10", 19, 20, 20' and 2'. In each case the rail pressure will stabilize for a given RPM and flow condition. The higher the RPM and flow rate, the higher the stabilized rail pressure. The ball valve will lift during the charging stroke when pressure in 14' exceeds the set pressure, but could reclose during the pumping stroke independent of the piston 19, only if the pumping chamber pressure is sufficiently high to move the piston 19. In that case the ball is "free floating" and will likely close due to the pressure differential across the ball during the pumping stroke. As stated above, there is a condition where the piston 19 can separate from the ball 12 to dump fuel through passage 19'. In that case the spring 22 is not acting against the ball.

FIGS. 6 and 7 show a transverse passage 10" between the pumping chamber 10 and the cavity or chamber 10' for the ball type relief valve 12. This passage 10" can be a direct hole through the sidewall of the chamber 10' behind the ball valve 12 (as depicted schematically in FIG. 2), or the passage 10" can open into the chamber 10' just behind the seat for ball valve 12. In FIGS. 6 and 7, the flow path between the pumping chamber 10 and the cavity or chamber 10' includes at least one fluted channel 10''' extending longitudinally along the outside of the front end of the sleeve 24, connecting the pumping chamber 10 to the transverse passage 10". Since the ball valve 12 is situated loosely within the sidewall wall of chamber 10', it is not critical where the flow passage 10" enters chamber 10'. The ID of the sidewall of chamber 10' can be sized to guide the ball 12 when it opens. This eliminates the possibility of the ball becoming permanently disengaged from the seat. It should also be appreciated that the spill connection 19' can take other forms.

A key aspect of the present invention is that the spring chamber 20 is fluidly isolated from fuel pumped in the pumping chamber 10 while the valve element 12 is closed. In the embodiment of FIGS. 2, 4, and 6 (wherein no overpressure spill path 19' is provided), spring chamber 20 can remains isolated from pumping chamber 10 whether or not the valve element 12 open. In the embodiment of FIGS. 3, 5, and 7 (wherein a pumping overpressure spill path 19' is provided), spring chamber 20 can be fluidly connected to the pumping chamber 20. Notwithstanding that chamber 10' at the front of the sleeve 24 is subject to the pumping pressure in chamber 10, in the illustrated embodiments, this isolation of the spring chamber 20 while the valve element 12 is closed is achieved by sealing diameter D2 of the central portion of piston 19 closely sliding within the central portion of sleeve 24 (as shown in FIGS. 6 and 7). If the overpressure spill connection 19' is not to be implemented, the back cavity 26 is not needed and the sleeve 24 can be further simplified.

The invention claimed is:

1. A single plunger high pressure fuel pump including a low pressure infeed leading to a pumping chamber, a pumping plunger for pressurizing fuel in the pumping chamber during a pumping stroke, an outlet valve for delivering pressurized fuel from the pumping chamber to a high pressure outlet line during the pumping stroke, a piston, and an overpressure relief valve with a relief inlet connected to the high pressure outlet line and exit flow passage connected to the pumping chamber for over pressure relief into the pumping chamber; wherein
the relief valve comprises a relief valve element that is spring biased to close against the relief inlet, and the spring is in a spring chamber that is fluidly isolated from the pumping chamber and said flow passage while the relief valve element is closed;
the piston slides in a sleeve and comprises a front end confronting the relief valve element and back end that is subject to loading by said spring, whereby the front end urges the relief valve element to close against a seat and the back end projects from the sleeve into the spring chamber, the piston closely slides in a bore along a piston sealing diameter (D2), the relief valve element is a ball that seals with a ball sealing diameter (D1) against said seat;
the sleeve has a front chamber in which the relief valve element and the front end of the piston are situated, a central bore in which a central portion of the piston slides, and a back chamber through which a back portion of the piston extends and which is in hydraulic communication with the spring chamber; and
the piston has a front port in said front chamber, a back port sealed by said central bore at an actuation distance X adjacent the back chamber when the relief valve element is seated, and an hydraulic passage between the front and back ports, whereby sliding of the piston away from said front chamber at least said actuation distance exposes said back port to said back chamber.

2. A single plunger high pressure fuel pump including a low pressure infeed leading to a pumping chamber, a pumping plunger for pressurizing fuel in the pumping chamber during a pumping stroke, an outlet valve for delivering pressurized fuel from the pumping chamber to a high pressure outlet line during the pumping stroke, an overpressure relief valve with a relief inlet connected to the high pressure outlet line and exit flow passage connected to the pumping chamber for over pressure relief into the pumping chamber, wherein the relief valve comprises a valve element that is spring biased against a relief valve seat sealing the inlet, the spring applies the bias to the valve element through a piston, the piston has one end that loads the valve element and another end that is loaded by said spring, and the spring is in a spring chamber connected to the low pressure infeed of the pump, wherein
the piston is slidable in a bore, and in a forward position within the bore the piston loads the valve element against said relief valve seat;
the piston is displaceable in the bore a first distance away from said relief valve seat by the valve element when the valve element is opened by the force differential between fuel pressure in the relief inlet exceeding the spring load and exceeding fuel pressure in the pumping chamber, whereby fuel in the relief is dumped through said relief valve seat into the pumping chamber;
the piston is displaceable in the bore a second distance greater than said first distance from said relief valve seat by the valve element when the valve element is opened by the force differential between fuel pressure in the relief inlet exceeding the spring load and the fuel pressure in the pumping chamber exceeding the fuel pressure in the relief inlet; and
the piston has a spill connection with an entry port in hydraulic communication with the pumping chamber, and a spill port that is covered by the bore while the piston is at said forward position or displaced less than said second distance, and said spill port is in hydraulic communication with said spring chamber when the piston is displaced at least said second distance;
whereby when the fuel pressure in the pumping chamber exceeds the fuel pressure in the relief inlet, the fuel pressure in said pumping chamber is relieved to the low pressure in said low pressure infeed.

3. The fuel pump of claim 2, wherein the piston closely slides in said bore along a piston sealing diameter, the relief valve element is a ball that seals at a ball sealing diameter against said relief valve seat, and the piston sealing diameter is less than or equal to the ball sealing diameter of the ball against said relief valve seat.

4. The fuel pump of claim 3, wherein the ball is located in a valve chamber at the pressure of the pumping chamber, the piston extends with one end in the valve chamber, and a close fit between the piston and the bore maintains a pressure difference between the valve chamber and a low pressure chamber in which the spring is situated.

5. The fuel pump of claim 4, wherein the spring chamber is in direct fluid communication with the low pressure infeed of the pump.

6. The fuel pump of claim 2, wherein the piston slides in a sleeve that has a front chamber in which a ball type relief valve element and a front end of the piston are situated; the sleeve has a central bore in which a central portion of the piston slides; and the piston has a back end that projects from the sleeve into the spring chamber.

7. The fuel pump of claim 6, wherein the sleeve includes a back chamber through which a back portion of the piston extends and which is in fluid communication with the spring chamber at said low infeed pressure.

8. The fuel pump of claim 7, wherein the piston has a front port in said front chamber, a back port sealed by said central bore at an actuation distance X adjacent the back cavity chamber when the valve element is seated, and a fluid passage between the front and back ports, whereby sliding of the piston away from said front chamber at least said actuation distance exposes said back port to the low infeed pressure in said back chamber.

9. The fuel pump of claim 7, wherein
the relief inlet leads to and is sealed against a front side of the relief valve element at said relief valve seat;

in a forward position within the bore the piston loads the relief valve element against said relief valve seat;

the pumping chamber fluidly communicates with the front chamber of the sleeve through a passage behind said relief valve seat;

the piston is displaceable in the bore a first distance less than "X" away from said relief valve seat by the relief valve element when the relief valve element is opened by the force differential between fuel pressure in the relief inlet exceeding the spring bias and exceeding fuel pressure in the pumping chamber, whereby fuel in the relief inlet is dumped through said relief valve seat into the pumping chamber;

the piston is displaceable in the bore a second distance greater than "X" from said relief valve seat by the relief valve element when the relief valve element is opened by the force differential between fuel pressure in the relief inlet exceeding the spring bias and the fuel pressure in chamber exceeding the fuel pressure in the relief inlet during a pump charging stroke;

the piston is displaceable in the bore a second distance greater than "X" from said relief valve seat by the force of fuel pressure in chamber acting against piston during a pumping stroke; and the piston has a spill connection with an entry port in hydraulic communication with the pumping chamber, and a spill port that is covered by the bore while the piston is at said forward position or displaced less than said second distance, and said spill port is in hydraulic communication with said spring chamber when the piston is displaced at least said second distance;

whereby when the fuel pressure in the back chamber exceeds the fuel pressure in the relief inlet, the fuel pressure in said pumping chamber is relieved to the low pressure in said low pressure infeed.

10. A single plunger high pressure fuel pump including a low pressure infeed leading to a pumping chamber, a pumping plunger for pressurizing fuel in the pumping chamber during a pumping stroke, an outlet valve for delivering pressurized fuel from the pumping chamber to a high pressure outlet line during the pumping stroke, an overpressure relief valve with a relief inlet connected to the high pressure outlet line and exit connected to the pumping chamber, wherein the relief valve comprises a valve element that is spring biased against a relief valve seat sealing the inlet, the spring applies the bias to the valve element through a piston;

the piston has one end that loads the valve element and another end that is loaded by said spring;

the spring is in a spring chamber connected to the low pressure infeed of the pump; and said one end of the piston is in hydraulic communication with the pumping chamber and said other end of the piston is in said spring chamber.

* * * * *